United States Patent [19]

Schmidt et al.

[11] 3,992,625

[45] Nov. 16, 1976

[54] METHOD AND APPARATUS FOR EXTRACTING IONS FROM A PARTIALLY IONIZED PLASMA USING A MAGNETIC FIELD GRADIENT

[75] Inventors: George Schmidt, Teaneck; Gerald M. Halpern, Somerville; William R. L. Thomas, Holmdel, all of N.J.

[73] Assignee: Jersey Nuclear-Avco Isotopes, Inc., Bellevue, Wash.

[22] Filed: Dec. 27, 1973

[21] Appl. No.: 428,665

[52] U.S. Cl. .............................. 250/284; 250/298; 250/423 P; 313/361
[51] Int. Cl.² .................................................. H01J 39/34
[58] Field of Search ........... 250/281, 282, 283, 284, 250/298, 299, 423 P; 335/210; 313/361, 362

[56] References Cited
UNITED STATES PATENTS

| | | | |
|---|---|---|---|
| 2,471,935 | 5/1949 | Coggeshall | 250/283 |
| 2,932,738 | 4/1960 | Bruck | 250/298 |
| 3,659,236 | 4/1972 | Whitehead | 250/298 |
| 3,772,519 | 11/1973 | Levy | 250/284 |
| 3,845,300 | 10/1974 | Rochling | 250/282 |

*Primary Examiner*—Craig E. Church
*Attorney, Agent, or Firm*—Weingarten, Maxham & Schurgin

[57] ABSTRACT

Method and apparatus for separating selectively ionized particles from a plasma of moving particles by application of a magnetic field gradient in a direction to which the ionized particles are to be accelerated for collection. By creating conditions of adiabatic particle motion for charged particles in the magnetic field, the selectively ionized particles will be induced to follow the magnetic field lines in the direction of weaker field strength. The direction of this gradient is made different from the general direction of particle motion to permit extraction of the ions from the plasma. The extracted ions deposit on a collection surface in enriched proportions.

43 Claims, 5 Drawing Figures

METHOD AND APPARATUS FOR EXTRACTING IONS FROM A PARTIALLY IONIZED PLASMA USING A MAGNETIC FIELD GRADIENT

FIELD OF THE INVENTION

This invention relates to the use of magnetic fields to accelerate charged particles and in particular to the use of magnetic field gradients to separate selectively ionized particles from a plasma.

BACKGROUND OF THE INVENTION

A technique for isotope separation, particularly for uranium $U_{235}$ enrichment, operates by selectively photoionizing particles of one isotope type, typically $U_{235}$, in an environment of plural isotope types including, for example, $U_{238}$, and by subsequently applying a crossed-field magnetohydrodynamic force to the selectively photoionized particles in order to accelerate them onto trajectories which carry them to collection surfaces where they are deposited. The crossed-field forces result from simultaneous application of orthogonal magnetic and electric fields. A typical example is shown in United States patent application Ser. No. 25,605, filed Mar. 25, 1970, and incorporated herein by reference.

An object of the present invention is to apply acceleration forces for the selectively ionized particles without the direct generation of magnetohydrodynamic forces.

SUMMARY OF THE INVENTION

In accordance with the preferred embodiment of the present invention, ions of a particular isotope type are separated from a plasma by accelerating such ions apart from the other particles in the plasma by the application of a magnetic field whose strength decreases in the direction to which the ions are accelerated (i.e. the ions are accelerated in a direction opposite to the gradient of the magnetic field). The magnetic field strength is controlled to provide adiabatic conditions of motion for at least the plasma electrons to cause their acceleration toward regions of lower field strength where collection surfaces are placed. The use of a magnetic field alone for ion extraction permits placement of the extraction means outside of the corrosive plasma environment.

The technique of the present invention may be applied to isotope separation in general, but is particularly useful for uranium enrichment employing either atomic or molecular form uranium. A flowing vapor state for the uranium is created and the vapor flow is passed into a region of a magnetic field gradient. The gradient is oriented in a direction towards one or more collection surfaces for the desired isotope. Radiant energy is applied to the flowing uranium environment in the region of the magnetic field to selectively ionize typically the $U_{235}$ isotope and to permit its acceleration by the magnetic field. A sufficiently strong magnetic field is selected to provide adiabatic motion such that the electrons and possibly the ions orbit on closed paths within the dimensions of the system. This permits their controlled acceleration in the direction of weaker magnetic field. In the case where adiabatic conditions are created for the electrons alone, the ions in the plasma will be drawn with the electrons in order to satisfy requirements of plasma charge neutrality.

BRIEF DESCRIPTION OF THE DRAWINGS

These and other features of the present invention will be mor fully understood by reference to the detailed description of the preferred embodiment presented below for purposes of illustration and not by way of limitation, and to the accompanying drawings of which.

DETAILED DESCRIPTION OF THE PREFERRED EMBODIMENT

The preferred embodiment of the present invention contemplates a method and apparatus for extracting ions, typically resulting from selective ionization of one uranium isotope type, from a plasma containing those selectively produced ions, as well as neutral particles by the action of a magnetic field gradient. The uranium or other substance to be ionized may be in atomic or molecular form and is preferably photoionized by laser radiant energy (one or more frequencies of radiation) tuned for energy level differences of one particular isotope.

Figure 1:
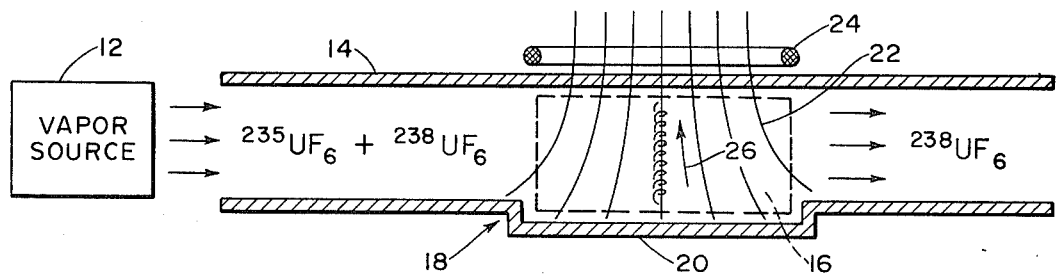
FIG. 1 is a diagram of one form of apparatus for providing gradient ion extraction according to the invention.

With reference to the drawings, and particularly FIG. 1, a uranium hexafloride gas supply 12 provides a vapor flow output into a tube 14. The uranium hexafloride compound has the uranium atom occurring in both the $U_{235}$ and $U_{238}$ isotopes. Suitable thermal control may be employed as desired to maintain the uranium hexafloride vapor at a desired temperature for flow into a chamber 16 which has a bottom recess portion 18 terminating in a bottom collection plate 20 adapted to receive ions accelerated out of the uranium hexafloride vapor flow. The region 16 directly above the collection plate 20 in the preferred embodiment is illuminated by ionizing laser radiant energy applied from a laser system described below. The applied laser radiation is adapted to produce one or more energy steps in the uranium hexafloride molecules of one uranium isotope type by providing a specific frequency or photon energy in the laser radiation for excitation of the molecule of that isotope type without corresponding excitation of molecules having the other isotope type. The region 16 where ionization is to occur has a magnetic field represented by lines of induction 22 applied thereto by one or more turns of an electric coil 24. The positioning of the coil 24 will create not only a magnetic field in the region 16, but a field of decreasing field strength in the downward direction corresponding to a gradient 26. This gradient permits the use of a magnetic field alone in conjunction with a moving particle flow to create an acceleration on the selectively ionized uranium hexafloride. Since the lines of magnetic induction will penetrate material useful for the walls of tube 14, the coil 24 may be placed outside of the tube 14 to prevent contamination of the coil 24 by the uranium hexafloride vapor flow and facilitate cooling. It is then possible to operate coil 24 in a super conducting state.

The plasma which results in the region 16 by the photo-ionization of the flowing uranium hexafloride contains positively charged ions as well as negatively charged electrons.

Figure 4:
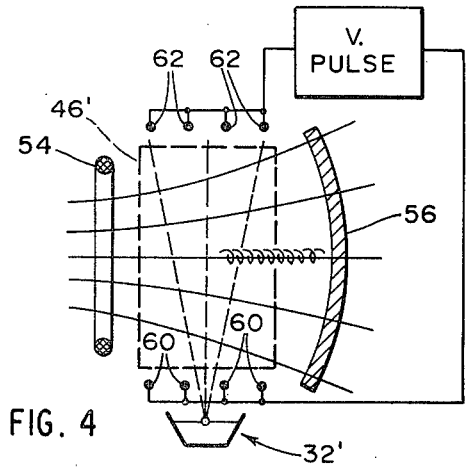
FIG. 4 is a diagram of a modification to the FIG. 3 apparatus.

The electrons are first imparted with an added velocity perpendicular to the magnetic field either by providing excess ionization energy similar to one eV in the radiation applied in region 16, or by providing a pulsed electric field originating from electrodes not shown (see FIG. 4). The electrons will then experience a magnetic force in the region 16. This will cause the electrons to gyrate with a gyroradius (Re) defined as:

$$Re = \frac{mV_\perp}{eB}$$

where $m$ is the electron mass, $e$ is the electron charge, $V_\perp$ is the component of electron velocity perpendicular to the magnetic field, and $B$ is the magnetic field strength. For an electron with an imparted energy of one electron volt and a magnetic field of one Kilogauss, the gyroradius is approximately $4 \times 10^{-3}$ centimeter. If the dimensions of the region 16 are on the order of centimeters and if the change in B is small over the distance of a gyroradius, the adiabatic conditions of motion are satisfied, justifying the use of the "guiding center approximation" for analysis. Using this approximation, the force on the electrons in the direction of weaker magnetic field is expressed as:

$$|F| = \frac{\epsilon}{B} |\text{grad } B| \simeq \frac{\epsilon}{L}$$

where L is the characteristic length of the magnetic field variation and $\epsilon$ is the electron energy assumed to be one electron volt. The acceleration of the plasma itself is then expressed as:

$$A = \left(\frac{1}{m+M}\right) \frac{\epsilon}{L}$$

where $M$ is the ion mass. This acceleration of the ion is based upon space charge considerations closely coupling the motions of the electrons to the motions of the ion. That is, the result of the acceleration directly applied to the electrons will create a small charge separation in the plasma and the resulting electric field tends to drag the ions along and maintain the general plasma neutrality. Using the above values, it is possible to calculate an acceleration of approximately $4 \times 10^7$ meters/sec.$^2$.

Preferably, for efficient operation, the ion of the desired isotope must be accelerated to a velocity of the same order or larger than the vapor flow velocity. This acceleration must be accomplished before a charge exchange collision occurs with a neutral of another isotope type. Assuming a vapor density of around $10^{14}$ particles per cubic centimeter which is controlled by the evaporation rate from source 32, the approximate mean time for a charge exchange collision is on the order of 30 microseconds. In this case, the ion will attain a velocity of over $10^5$ cm/sec. before charge exchange occurs. This velocity will typically be larger than the thermal velocity of the ions in the plasma so that the molecules of the desired isotope type will collect on the plate 20 in proportions substantially greater than their proportions in the vapor.

Figure 2:
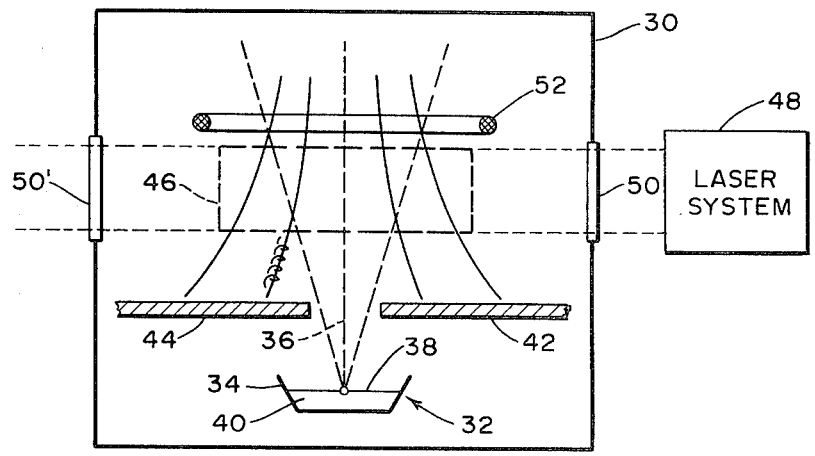
FIG. 2 is a diagram of a further form of apparatus for providing gradient ion extraction according to the invention.
Figure 3:
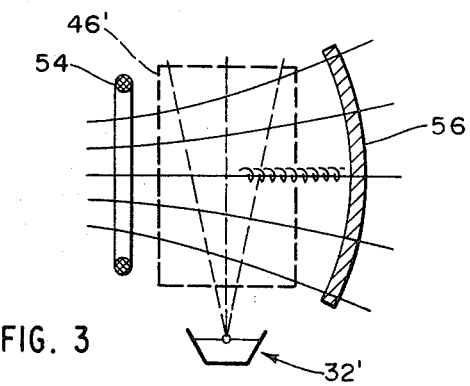
FIG. 3 is a diagram of a yet further form of apparatus for providing gradient ion extraction according to the invention.

The technology described above with reference to FIG. 1 may be employed in other configurations, examples of which are shown in FIGS. 2, 3 and 4. There a vapor of elemental uranium rather than the molecule of uranium hexafloride is employed as the source of isotope types to be separated. This has the advantage of providing more distinct isotope absorption lines than in the molecular case which greatly increases the selectivity of ionization of the desired isotope type, typically $U_{235}$, and thereby increases the yield of the system. With particular reference to FIG. 2, a modification to the system of the present invention comprises within a substantially evacuated chamber 30, a source 32 of uranium vapor produced from elemental uranium. Source 32 comprises a crucible 34 of uranium metal which is heated by direct application of heat or radiant energy such as by an electron beam to produce a vaporized uranium flow 36. The flow 36 is directed away from the surface 38 of uranium mass 40 and collimated by collection plates 42 and 44 to pass into a region 46. A laser system 48, consisting of one or more tunable lasers, applies photoionizing radiant energy to the chamber 30 through, typically, a window 50 and exits the chamber through a similar window 50'. A coil 52 of one or more turns carries current from a current source (not shown) and is placed substantially coaxial with the center of the vapor flow 36. Coil 52 provides a magnetic field similar to that produced by coil 24 in FIG. 1 with lines of magnetic induction and a magnetic field gradient substantially parallel to the center line of the flow 36.

The laser system 48 may comprise one or more lasers and is tuned to produce photoionization of the $U_{235}$, or other isotope in the flow 36, in typically sequential, selective excitation and ionization steps. The total energy of these steps will just exceed the ionization potential of the uranium isotope to be separated in the case where the extra electron velocity is imparted by an electric field from an electrode structure shown with respect to FIG. 4. Where the extra velocity is contributed by the laser photons, the total energy of the energy steps for ionization, correspondingly defined by the sum of the photon energies of the individual one or more laser radiations, will exceed the ionization potential by typically one electron volt. A laser system like system 48 will be employed for the FIGS. 1, 3 and 4 configurations as well.

A plasma is thus created in the region 46 which has electrons and ions resulting from photoionization. The magnetic field gradient in the FIG. 2 embodiment is directed parallel to the motion of the electrons and ions in the flow 36 and in accordance with the above-described theory will accordingly tend to decelerate the extra energetic electrons and reaccelerate them in an opposite direction toward collection plates 44 and 42 generally along the magnetic field lines on which they were when released from the ions. The accelerated electrons will induce the ions in region 46 to follow them toward the collection plates 44 and 42 where they may be collected separately from the other components in the flow 36.

FIG. 3 shows a further embodiment of the present system having a source 32' for an elemental uranium vapor flow substantially similar to source 32 in FIG. 2. The uranium vapor flows into an ionization region 46' between a magnetic coil 54 and an arcuate collection plate 56, generally oriented to have its surface facing the vapor flow and orthogonal to the lines of magnetic induction. Instead of deflecting and accelerating the electrons and accordingly ions resulting from photoionization in a downward direction as in FIGS. 1 and 2, the direction of magnetic field gradient in FIG. 3 is directed toward the left and will accordingly force the electrons, and the ions with them, in a direction for collection on plate 56. It is, of course, apparent that the structure of FIG. 3 will preferably fit within the chamber 30 of FIG. 2 and be excited by a similar laser system 48. In addition, although coils 52 and 54 are shown within the plasma region, they may be placed outside that region in the manner of FIG. 1.

The structure of FIG. 3 is shown in FIG. 4 with the addition of first and second sets of electrodes 60 and 62 which are pulsed by a voltage pulse source 64 directly subsequent to selective ionization to produce an electric field in the direction of vapor flow. The voltage between electrodes 60 and 62 is at a level sufficient to accelerate electrons to a one eV energy in a period preferably very short with respect to the mean time to charge exchange. Thereafter, the voltage pulse is preferably terminated. The electrodes 60 and 62 may also be employed in the configurations of FIGS. 1 and 2 when the extra one $eV$ imparted to the electrons is to be produced by accelerations in an electric field.

Figure 5:
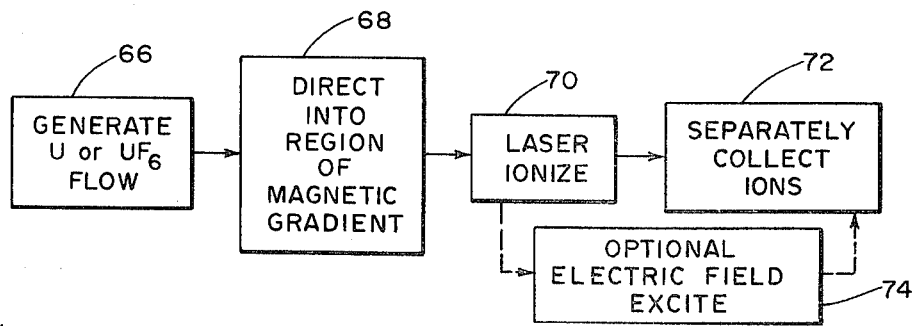
FIG. 5 is a diagram illustrating the process operative in practicing the invention.

In FIG. 5, a process diagram illustrates typical steps in the technique of enrichment according to the present invention and provides a summary of the above description. In an initial step 66, elemental uranium, molecular uranium hexafloride or other elements or compounds are generated as a vapor flow which in step 68 is directed into the region of a magnetic field gradient such as regions 16, 46 or 46'. Within these regions, a burst of laser radiation is applied in a step 70 to ionize a predetermined isotope type. The effect of the magnetic field gradient is to accelerate the electrons and accordingly the ions in a direction for separate collection in a step 72. In one embodiment, the ionizing step 70 includes the application of sufficient laser photon energy to not only ionize the atoms or molecules of the vapor flow generated in step 66 but to impart extra energy to the electrons on the order of typically one electron volt. In another embodiment, the laser photon energies are selected for isotopically selective ionization alone and the extra energy is imparted by a further electric field acceleration step 74.

The preferred embodiment of the present invention has been described above in the context of a system for isotope separation, and particularly uranium enrichment. It is important to recognize that the invention may be utilized to separate ions from a plasma, however created, in applications other than isotope separation or enrichment. These and other modifications to the disclosed specific embodiment will occur to those skilled in the art, and accordingly it is intended to limit the scope of the invention only as indicated in the following claims.

What is claimed is:

1. A system for separating particles from a plasma to permit separate collection thereof comprising:
   means for generating a plasma with a predetermined flow and having ionized particles of a predetermined isotope type;
   means for applying a magnetic field to said plasma;
   said magnetic field applying means including means for producing a gradient in the applied magnetic field with the direction opposite to the gradient being in a direction diffrent from the flow of said plasma;
   the gradient producing an acceleration on the flowing ionized particles of said plasma to accelerate them in the direction of weaker magnetic field.

2. The system of claim 1 wherein said generating means includes means for imparting additional energy to the electrons of said plasma beyond the energy of ionization.

3. The system of claim 2 wherein said additional energy is at least approximately one electron volt.

4. The system of claim 2 wherein said means for imparting additional energy includes means for applying a pulsed electric field to said plasma.

5. The system of claim 1 further including means for receiving the accelerated ionized particles of said plasma for collection thereof.

6. The system of claim 1 wherein said magnetic field applying means is located apart from the environment of said plasma.

7. The system of claim 1 wherein said magnetic field applying means includes a superconducting coil.

8. The system of claim 1 wherein said plasma includes particles of uranium hexafloride.

9. The system of claim 1 wherein said plasma includes particles of elemental uranium.

10. The system of claim 1 wherein said means for generating said plasma includes:
    means for generating a vapor flow of particles having a plurality of said isotope types; and
    means for ionizing a selected isotope type in the particles of said vapor flow.

11. The system of claim 10 wherein said ionizing means includes laser means tuned for isotopically selective excitation of the particles of said selected isotope type.

12. The system of claim 11 wherein said laser means is operative to impart additional energy to the electrons of said plasma created during ionization.

13. The system of claim 10 wherein said means for generating the vapor flow further includes:
    means for evaporating elemental uranium to provide said vapor flow.

14. The system of claim 1 wherein said magnetic field applying means includes means for applying magnetic lines of induction generally orthogonal to the vapor flow.

15. The system of claim 1 wherein said means for applying said magnetic field further includes a coil surrounding said vapor flow applying magnetic lines of induction in a direction generally parallel to the vapor flow.

16. The system of claim 1 wherein said means for applying a magnetic field provides a magnetic field of sufficient strength to provide adiabatic conditions of motion for electrons in said plasma.

17. A system for separating particles of one isotope type from an environment having particles of plural isotope types, said system comprising:
    a chamber;
    means for establishing a vapor flow in said chamber to define said environment of plural isotope types;
    a conducting coil for applying a non-uniform magnetic field in said chamber with a gradient generally in the direction of said coil;

the direction opposite to said gradient being a direction which is other than antiparallel to the direction of said vapor flow;

a laser system periodically applying laser radiant energy to the vapor flow of said chamber in the region of said magnetic field gradient;

said laser radiant energy having photons of an energy which produces isotopically selective ionization of particles of said one isotope type in said vapor flow;

the gradient in said magnetic field inducing an acceleration on the ionized particles in the direction opposite to the gradient; and means for collecting the accelerated ionized particles apart from said vapor flow in the environment.

18. The system of claim 17 wherein said coil is positioned external of said chamber.

19. The system of claim 17 wherein said gradient is in a direction parallel to said vapor flow.

20. The system of claim 17 further including:
a plurality of electrodes positioned in said vapor flow to apply an electric field therein; and
means for applying an electric pulse to said electrodes to provide additional energy to the electrons of said environment subsequent to ionization of the particles of the one isotope type.

21. The system of claim 17 wherein the laser radiant energy includes photon energies for selective photoionization which exceeds the ionization potential for the particles of said one isotope type by at least approximately one electron volt.

22. A method for separating particles from a plasma to permit separate collection thereof comprising the steps of:
generating a plasma with a predetermined flow and having ionized particles of a predetermined isotope type;
applying a magnetic field to said plasma;
the applied magnetic field having a gradient in the applied magnetic field with the direction opposite to the gradient being different from the flow of said plasma;
the gradient producing an acceleration on the flowing ionized particles of said plasma to accelerate them in the direction of weaker magnetic field.

23. The method of claim 22 wherein said generating step includes the step of imparting additional energy to the electrons of said plasma beyond the energy of ionization.

24. The method of claim 23 wherein said additional energy is at least approximately one electron volt.

25. The method of claim 23 wherein the step of imparting additional energy includes applying a pulsed electric field to said plasma.

26. The method of claim 22 further including the step of receiving the accelerated ionized particles of said plasma for collection thereof.

27. The method of claim 22 wherein said applied magnetic field is located apart from the environment of said plasma.

28. The method of claim 22 wherein said magnetic field is applied by a superconducting coil.

29. The method of claim 22 wherein said plasma includes particles of uranium hexafloride.

30. The method of claim 22 wherein said plasma includes particles of elemental uranium.

31. The method of claim 22 wherein the step of generating said plasma includes the steps of:

generating a vapor flow of a plurality of said isotope types; and
ionizing a selected isotope type in the particles of said vapor flow.

32. The method of claim 31 wherein the ionizing steps include the steps of generating laser radiant energy tuned for isotopically selective excitation of the particles of said selected isotope type.

33. The method of claim 32 wherein said laser energy is operative to impart additional energy to the electrons of said plasma created during ionization.

34. The method of claim 31 wherein the step of generating the vapor flow further includes the step of evaporating elemental uranium to provide said vapor flow.

35. The method of claim 22 wherein the step of applying the magnetic field includes the step of applying magnetic lines of induction generally orthogonal to the plasma flow.

36. The method of claim 22 wherein the step of applying the magnetic field further includes the step of applying magnetic lines of induction in a direction generally parallel to the plasma flow with weakening magnetic field in the direction of the vapor flow source.

37. The method of claim 22 wherein the step of applying the magnetic field includes the step of providing a magnetic field of sufficient strength to provide adiabatic conditions of motion for electrons in said plasma.

38. A method for separating particles of one isotope type from an environment having particles of plural isotope types, said method comprising the steps of:
establishing a vapor flow in a chamber to define said environment of plural isotope types;
applying by a coil a non-uniform magnetic field in said chamber with a gradient generally in the direction of said coil;
the direction opposite to said gradient being a direction which is other than antiparallel to the direction of said vapor flow;
periodically applying laser radiant energy to the vapor flow of said chamber in the region of said magnetic field gradient;
said laser radiant energy having photons of an energy which produces isotopically selective ionization of particles of said one isotope type in said vapor flow;
the gradient in said magnetic field inducing an acceleration on the ionized particles in the direction opposite to the gradient; and
collecting the accelerated ionized particles apart from said vapor flow in the environment.

39. The method of claim 38 wherein said gradient is in a direction parallel to said vapor flow.

40. The method of claim 38 further including the steps of:
applying an electric field pulse to electrodes in said vapor flow to provide additional energy to the electrons of said environment subsequent to ionization of the particles of the one isotope type.

41. The method of claim 38 wherein the laser radiant energy includes photon energies for selective photoionization which exceed the ionization potential for the particles of said one isotope type by at least aproximately one electron volt.

42. A method for separating ions from a plasma comprising the steps of:
generating a plasma with a predetermined flow having ionized particles of a predetermined isotope type;

applying a magnetic field to the flowing plasma with a gradient therein in a direction to accelerate the ions of said plasma substantially in the direction of weaker magnetic field in said gradient; and orienting said gradient to provide said acceleration in a direction distinct from the plasma flow direction.

43. A method for separating ions from a plasma comprising the steps of:

generating a vapor flow of particles including uranium;

directing said uranium vapor flow into the region of a magnetic field gradient;

photoionizing predetermined particles of said uranium vapor flow in the region of said magnetic field gradient; and separately collecting the ions accelerated by said magnetic field gradient in the direction of weaker magnetic field.

* * * * *